US005473956A

United States Patent [19]

Murata et al.

[11] Patent Number: 5,473,956

[45] Date of Patent: Dec. 12, 1995

[54] STARTER WITH EPICYCLE REDUCTION GEAR

[75] Inventors: Mitsuhiro Murata, Arrjyo; Yashiro Nagao, Okazaki; Nobuyuki Hayashi, Nagoya; Tsutomu Shiga, Nukata, all of Japan

[73] Assignee: Nippondenso Co., Ltd., Kariya, Japan

[21] Appl. No.: 328,153

[22] Filed: Oct. 24, 1994

[30] Foreign Application Priority Data

Oct. 25, 1993 [JP] Japan .................................... 5-266078

[51] Int. Cl.[6] ............................ F02N 15/06; F16H 57/10; F16H 1/32

[52] U.S. Cl. .................................................. 74/7 E; 74/7 A

[58] Field of Search ........................ 74/7 E, 7 A; 475/263

[56] References Cited

U.S. PATENT DOCUMENTS

| | | | |
|---|---|---|---|
| 4,494,414 | 1/1985 | Hamano | 475/263 X |
| 4,528,470 | 7/1985 | Young et al. | 74/7 E X |
| 4,635,489 | 1/1987 | Imamura et al. | 475/265 X |
| 5,199,309 | 4/1993 | Isozumi | 74/7 E |

FOREIGN PATENT DOCUMENTS

| | | |
|---|---|---|
| 1273372 | 12/1984 | European Pat. Off. . |
| 529456 | 3/1993 | European Pat. Off. . |
| 52-19528 | 7/1950 | Japan . |
| 140380 | 12/1920 | United Kingdom . |

OTHER PUBLICATIONS

Patent Abstract of Japan, vol. 13 No. 365 (M-859,(3713) 8/1989 re JP-A 1-121566.

*Primary Examiner*—Allan D. Herrmann
*Attorney, Agent, or Firm*—Cushman, Darby & Cushman

[57] ABSTRACT

A starter with an epicycle reduction gear having a one-way clutch within the casing thereof, which can shut off dust and filthy water, has a simplified structure, has a reduced number of parts and components, has reduced size and weight and has improved durability of the one-way clutch. Such a starter achieves these effects by housing the one-way clutch within the casing of the epicycle reduction gear. The one-way clutch is housed within the casing of the epicycle reduction gear, which includes a plurality of planetary gears. The one-way clutch comprises a small-diameter cylindrical part of the casing, serving as a clutch inner member, a small-diameter cylindrical part of the internal gear, serving as a clutch outer member, fit on the small-diameter cylindrical part of the casing, a clutch roller disposed between the small-diameter cylindrical part of the casing and the small-diameter cylindrical part of internal gear, and a spring. The internal gear includes a large-diameter cylindrical part with an annular face. The one-way clutch is formed so as to have a smaller diameter than the outside diameter of the large-diameter cylindrical part of the internal gear.

10 Claims, 3 Drawing Sheets

STARTER WITH EPICYCLE REDUCTION GEAR

CROSS REFERENCE TED APPLICATIONS

This application is based upon and claims priority from Japanese Patent Application 5-266078, filed Oct. 25, 1993, the contents of which are incorporated herein by reference.

BACKGROUND OF THE INVENTION

1. Field of the Invention

The present invention generally relates to a starter having an epicycle reduction gear. More particularly, the present invention relates to a starter for starting an internal combustion engine having an epicycle reduction gear.

2. Related Art

It is common for starters for internal combustion engines to have a one-way clutch, which prevents driving of a starter motor by the engine when the engine is started. Normally, the one-way clutch is directly connected to a pinion gear.

Japanese Utility Model Publication Laid-Open No. 52-19528 discloses a starter equipped with an epicycle reduction gear. In this document, the one-way clutch is disposed between the outer periphery of an internal gear in the epicycle reduction gear and the inner periphery of the casing encompassing the epicycle reduction gear. Because the epicycle reduction gear and the one-way clutch are integrally formed, the one-way clutch is protected by the casing of the epicycle reduction gear from external dust and contaminated water, which could otherwise cause problems to the one-way clutch. Therefore, no additional sealing member, such as a casing and an O-ring, is required to be provided to the one-way clutch. Such a device provides a simplified structure.

However, in this structure, the one-way clutch is also disposed at the exterior edge of the internal gear, which needs to have a large diameter in order to house an epicycle reduction gear. Therefore, it is inevitable that the outside diameter of the casing encompassing the one-way clutch, i.e., the external diameter of the epicycle reduction gear integrally formed with the one-way clutch, is quite large. Such a structural feature causes the following problems.

The internal gear composes a clutch inner member, and a clutch outer member, which are mounted on the outside of the internal gear through a clutch roller. However, as the clutch outer member is large in diameter, the total weight of the system is increased.

Recently, a starter has been proposed that includes a starter motor that may be driven at high speeds and is then decelerated by an epicycle reduction gear in order to reduce the size and weight of the starter while simultaneously increasing its torque. This type of high-speed starter motor has been downsized in diameter so as to reduce the inertial mass and increase the resistance to centrifugal force. Accordingly, if a starter motor having a small diameter is equipped with an epicycle reduction gear integrally formed with a one-way clutch having a large diameter, the portion of the epicycle reduction gear integrally formed with the one-way clutch forms a flange that adversely affects the starter motor.

It is generally accepted that a starter will have a cylindrical magnet switch disposed adjacent to the starter motor. In such an arrangement, the magnet switch is disposed adjacent to and at the outside of the flange-like epicycle reduction gear integrally formed with a one-way clutch. As a result, a space that is not filled, i.e. a void, is formed between the starter motor and the magnet switch, thus adversely affecting the compactness of the starter.

In this case, if the internal gear is made thinner, the mean diameter of the one-way clutch can be reduced by the reduced amount of thickness of the internal gear. However, this manner of reducing the thickness and the overall size is not recommended, as problems, such as decreases in transmission efficiency and degradation of durability of the starter, occur due to deformation of the internal gear.

Furthermore, when the clutch of such a starter is in overrun idling, because the circumferential speed of the internal gear used as the clutch inner member is high and the outside diameter of the internal gear is large, the distances of idle sliding of the clutch roller and clutch inner member increase, thus increasing the wear and tear on the clutch inner member.

SUMMARY OF THE INVENTION

In view of the above problems with conventional starters, the object of the present invention is to obviate problem of conventional starters.

It is a further object of the invention to provide a starter with an epicycle reduction gear having a one-way clutch, which prevents dust and contaminated water from accumulating in the gear.

It is a still further object of the present invention to simplifiy the starter structure, reduces the number of parts and components, reduces the size and weight of the starter, and/or also improves the durability of the one-way clutch by housing the one-way clutch within the casing housing an epicycle reduction gear.

The starter with an epicycle reduction gear according to the present invention includes an armature shaft of a starter motor having a sun gear provided on the outer periphery thereof. A drive shaft having a large diameter part pivotally supports planetary gears meshed with the sun gear. The drive shaft is disposed coaxially with the armature shaft. An internal gear with a large-diameter cylindrical part with an annular face formed on the inner periphery meshes with the planetary gears. A casing encompasses the sun gear, the planetary gears and the internal gear. The present invention also includes a one-way clutch disposed between the internal gear and the inner periphery of the casing. The one-way clutch is disposed in a position at the side of the internal gear, and the clutch is smaller in diameter than the outer periphery of the large-diameter cylindrical part of the internal gear.

Here, the description that the one-way clutch is located in a position with a smaller diameter than the outer periphery of the large-diameter cylindrical part of the internal gear means that the outside diameter of the clutch roller or pawl of the one-way clutch is smaller than the outside diameter of the large-diameter cylindrical part of the internal gear.

In a preferred mode, the casing comprises a large-diameter cylindrical part and an end-wall part both of which compose a cylinder with the bottom of the cylinder encompassing the internal gear. A small-diameter cylindrical part extends from the central part of the end-wall part to the internal gear and extends coaxially with the large-diameter cylindrical part and includes a clutch inner member as part of the one-way clutch.

Also, the internal gear includes a small-diameter cylindrical part encompassing the outer periphery of the small-diameter cylindrical part of the casing and serving as a clutch outer member of the one-way clutch. A large-diameter cylindrical part having interior teeth is formed to be larger in diameter than the small-diameter cylindrical part.

In a preferred mode, the internal gear comprises a small-diameter cylindrical part having a clutch inner member of a one-way clutch and a large-diameter cylindrical part having an annular face and formed to be larger in diameter than the small-diameter cylindrical part.

The casing encompasses the outer periphery of the small-diameter cylindrical part of the internal gear and includes a clutch outer member that is part of the one-way clutch.

In a preferred mode, the one-way clutch includes a ratchet-type clutch disposed between an end-wall part of the casing and an end-wall face of the internal gear facing the end-wall part.

Further, in a preferred mode, the one-way clutch is disposed at the side of the outer periphery of a bearing rotatably supporting the armature shaft or the drive shaft.

When the ring gear of an internal combustion engine rotates at a speed higher than that of a pinion gear, the one-way clutch, which is disposed within a casing housing the epicycle reduction gear and disposed between the casing and an internal gear, is actuated. As a result, the transmission of the torque of the planetary gears connected to the pinion gear to the armature shaft of the starter motor connected to a sun gear is prevented.

Particularly, in the present invention, as the one-way clutch is disposed between the internal gear and the casing in a position smaller in diameter than the outside diameter of the large-diameter cylindrical part of the internal gear formed with an annular face meshing with the planetary gears and at the side of the internal gear, the following advantageous effects are obtained.

First, in comparison with conventional epicycle reduction gears equipped with a one-way clutch, there is no need to dispose the one-way clutch at the side of the outer periphery of the internal gear and consequently the one-way clutch can be made smaller in diameter. As a result, the weight and space requirements of the one-way clutch are reduced.

Second, even if a high-speed motor, which is made smaller in diameter, is employed as a starter motor, the epicycle reduction gear equipped with a one-way clutch does not need to include a flange. As a result, the whole structure can be downsized and unused space can be eliminated.

Third, the relative circumferential speeds of the friction members (e.g., clutch roller, pawl) in the one-way clutch can be reduced when the one-way clutch is in an idling state. As a result, the wear of the friction members can be reduced, and the serviceable lives thereof can be prolonged.

Accordingly, in the epicycle reduction gear equipped with a one-way clutch according to the present invention, as the one-way clutch is housed within a casing which houses the epicycle reduction gear, dust and contaminated water do not affect the invention, the structure is simplified as compared to the prior art, and the number of necessary parts and components is reduced. In addition, as the one-way clutch is located in a position small in diameter and at the side of the above epicycle reduction gear, the size and weight of the starter can be reduced, and the durability thereof can be improved.

BRIEF DESCRIPTION OF THE DRAWINGS

Other features, characteristics and advantages of the present invention will become apparent to a person of ordinary skill in the art based upon the following detailed description, drawings and claims, all of which form a part of this application. In the drawings:

DETAILED DESCRIPTION OF THE PRESENTLY PREFERRED EXEMPLARY EMBODIMENTS

An embodiment of a starter with epicycle reduction gear according to the present invention will now be described referring to FIGS. 1 and 2.

Figure 1:
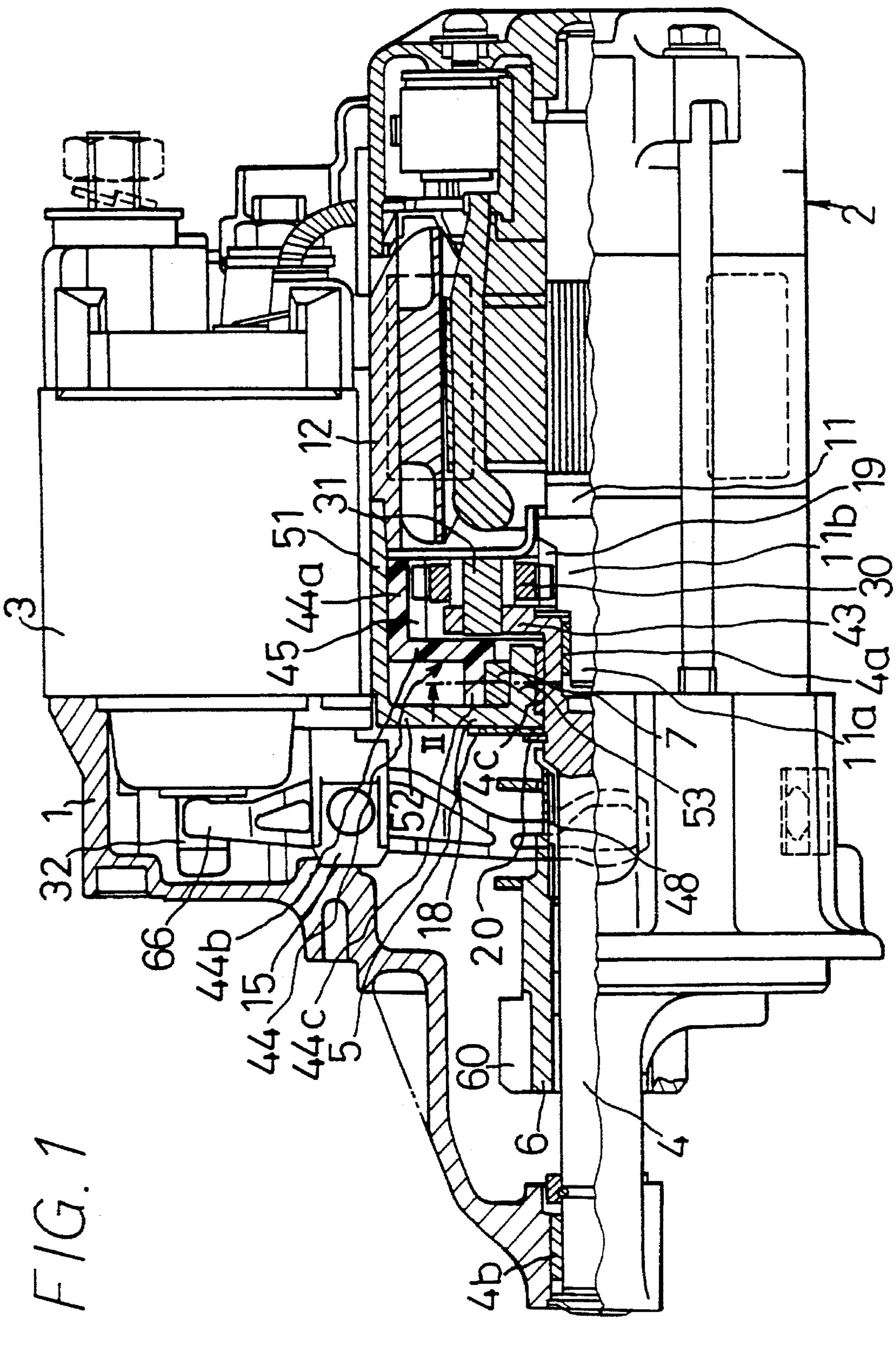
FIG. 1 is a partial cross-sectional view in the axial direction illustrating the first embodiment of the starter with epicycle reduction gear according to the present invention.

In FIG. 1, starter motor 2 is fastened to the right end of housing 1, and magnet switch 3 is fastened to housing 1 adjacent to the top of starter motor 2 (as viewed in this figure).

The right-end portion of armature shaft 11 of starter motor 2, i.e., the spindle of the starter motor 2, is rotatably supported by an end bracket (not illustrated) of the starter motor 2. Small-diameter portion **11*a* of the distal left-end portion of armature shaft 11 is rotatably supported by bearing 4*a* within a recessed part at the distal right-end portion of drive shaft 4**.

Numeral 12 denotes a yoke of starter motor 2. Distal left-end portion adjacent to portion **11*a* of armature shaft 11 also has large-diameter portion 11*b*, at the outer periphery of which is formed sun gear 19, and small-diameter portion 11*a* further protrudes from large-diameter portion 11*b***.

Drive shaft 4 is provided so as to extend to the left and be coaxial with the armature shaft 11 (as viewed in this figure). Distal left-end portion of drive shaft 4 is rotatably supported by housing 1 through bearing **4*b*, while distal right-end portion of drive shaft 4 is rotatably supported by a center case, referred to as casing in the following description, through a bearing 4*c***.

On the outer periphery of the central part of drive shaft 4 is a helical-spline 48 fit to spline tube 6, which includes pinion gear 60 on one end portion thereof, through helical spline 48 formed on drive shaft 4. On the other hand, shift lever 66 is pivotally supported by supporting part 15 disposed within housing 1. Shift lever 66 is engaged at one end in the outer periphery of spline tube 6 and connected at the other end to plunger 32 of magnet switch 3.

The description will now turn to the structure and operation of the epicycle reduction gear.

At the distal right-end portion of the drive shaft 4, flange-like large-diameter part 43 is provided. A plurality of pins 31 are force fit into through holes formed in the large-diameter part 43, with protrusion portions of pins 31 rotatably supporting a plurality of planetary gears 30 via bearings.

Planetary gears 30 mesh with sun gear 19 at the large-diameter side and also mesh with annulus 45 of an internal gear 44 at the large-diameter side.

Internal gear 44 is cylindrically shaped with both ends open and provided with annulus 45 on the inner periphery. Internal gear 44 is disposed coaxially with armature shaft 11.

Center case 5, which is referred to as a casing in the following description, is roughly cylindrical with the bottom and the outer periphery thereof fixed to housing 1. Center case 5 includes a gear box housing the above-described epicycle reduction gear. As illustrated in FIG. 1, center case 5 comprises large diameter cylindrical part 51, end-wall part 52 extending radially and inwardly from the left end of large-diameter cylindrical part 51, and small-diameter cylindrical part 53 axially extending from the inner end of end-wall part 52 in parallel with part 51. Small-diameter cylindrical part 53 is fit into bearing 4*c* for rotatably supporting the drive shaft 4. Furthermore, the left end of small-diameter cylindrical part 53 is locked by circlip 20 through stress washer 18. Center case 5 is fixed and radially caught between yoke 12 and housing 1.

Next, one-way clutch 7, which characterizes this embodiment, will be described with further reference to FIG. 2.

Internal gear 44 comprises large-diameter part 44*a* provided with annulus 45 on the internal periphery, end-wall part 44*b* extending radially and inwardly from the left end of large-diameter part 44*a*, and small-diameter cylindrical part 44*c* provided extending to the left from the central part of end-wall part 44*b*.

Small-diameter cylindrical part 44*c* of the internal gear 44 and small-diameter cylindrical part 53 of center case 5 make up one-way clutch 7 together with clutch roller 70 disposed therebetween and spring 71 (described later). End-wall part 44*b* of internal gear 44 and end-wall part 52 of center case 5 can slidably contact both end faces of clutch roller 70 to regulate the axial deviation of clutch roller 70.

Figure 2:
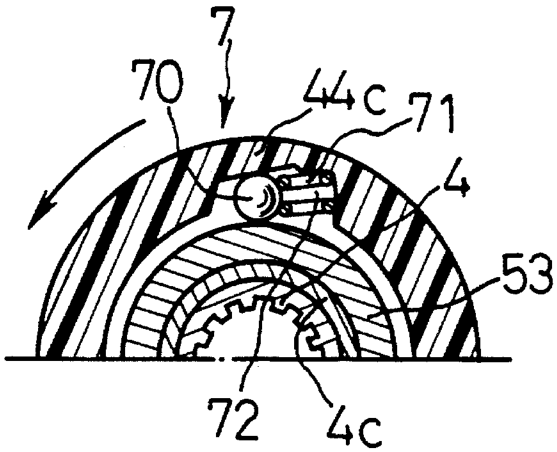
FIG. 2 is an enlarged cross-sectional view taken along a dot-dash line and viewed from the direction as indicated by an arrow II in FIG. 1.

FIG. 2 is an enlarged cross-sectional view illustrating one-way clutch 7 taken along a dot-dash line and viewed in the direction as indicated by arrow II in FIG. 1.

The operational principle of the starter according to the present invention will be described.

When magnet switch 3 is turned ON and plunger 32 of magnet switch 3 pivots shift lever 66, shift lever 66 thrusts spline tube 6 and pinion gear 60 towards a ring gear of an engine (not illustrated).

Immediately before pinion gear 60 contacts the ring gear, starter motor 2 is actuated to rotate armature shaft 11. Driven by armature shaft 11, planetary gears 30 rotate through sun gear 19 and drive internal gear 44.

In FIG. 2, when internal gear 44 rotates, clutch roller 70 frictionally displaces to the right within wedge room 72 against spring 71. Wedge room 72 is so formed that the radial space thereof becomes slightly smaller towards the left side (as viewed in this figure). In this arrangement, small-diameter cylindrical part 44*c* of internal gear 44 is locked to small-diameter cylindrical part 53 of center case 5 through clutch roller 70.

Thus, the rotation of armature shaft 11 is decelerated by planetary gears 30 and rotates drive shaft 4. In turn, drive shaft 4 rotatively thrusts spline tube 6 through helical spline 48, thus allowing the pinion gear 60 to rotate the ring gear.

If starter motor 2 starts and overruns, pinion gear 60 receives excessive torque from the ring gear, and planetary gears 30 begin to rotate at a high speed. At this time, internal gear 44 receives the torque in a direction opposite to the direction of the torque that internal gear 44 receives when being driven, whereby the clutch roller 70 is pressed by spring 71 and is displaced within the wedge room 72 to the left towards the wide radial space. As a result, small-diameter cylindrical part 44*c* of internal gear 44 and center case 5 are unlocked.

As described above, one-way clutch 7 of this embodiment adopts small diameter cylindrical part 53 as a clutch inner member for rotatably supporting drive shaft 4 of center case 5. Therefore, small-diameter one-way clutch 7 can be housed within center case 5 without changing the structure and volume of center case 5.

Accordingly, the circumferential speed of small-diameter cylindrical part 44*c* of internal gear 44 used as a clutch outer member can be reduced in case of overrun. Furthermore, the distances of idle sliding on the outer peripheries of the clutch roller 70 and small diameter cylindrical part 53 are reduced, and the wear of the peripheries thereof is reduced and consequently the durability is remarkably improved. In addition, one-way clutch 7 is remarkably downsized and lightened in comparison with the case where one-way clutch is provided at the side of the outer periphery of the epicycle reduction gear.

Here, internal gear 44 is formed by molding 66 nylon, and center case 5 is easily formed by deep drawing a carbon steel plate and press machining the same in multiple stages. However, it is apparent that any other producing method or material can freely be used.

Figure 3:
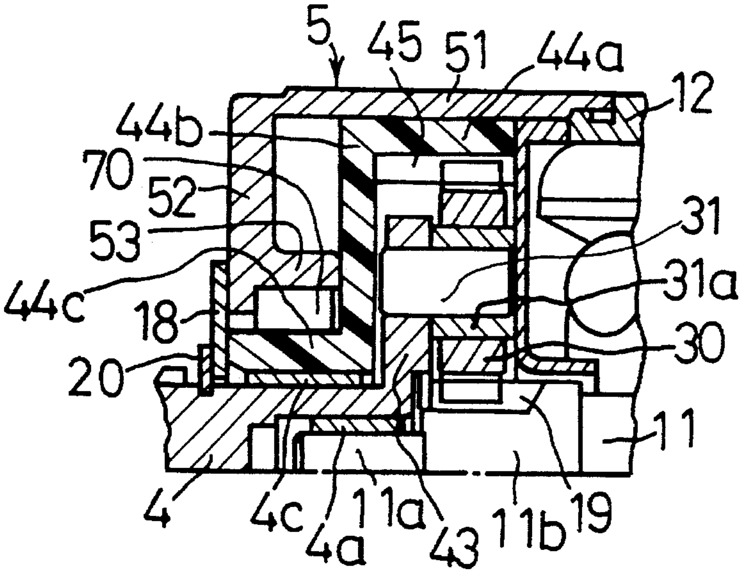
FIG. 3 is a partial cross-sectional view in the axial direction illustrating the second embodiment of the present invention.
Figure 4:
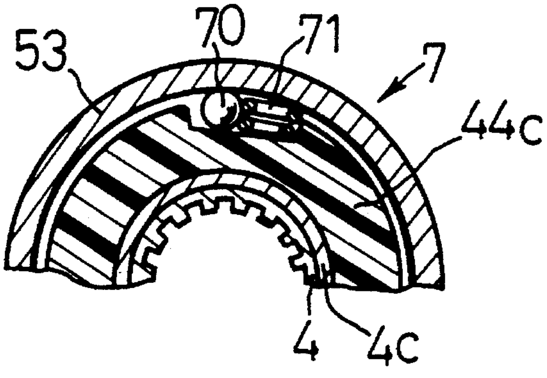
FIG. 4 is an enlarged cross-sectional view in the radial direction illustrating the main part of FIG. 3.

The second embodiment of the present invention will now be described with reference to FIGS. 3 and 4. Common elements with the first embodiment are represented by common reference numbers.

In the second embodiment, drive shaft 4 is rotatably supported by small-diameter cylindrical part 44*c* of internal gear 44 through bearing 4*c*. Clutch roller 70 is disposed between the outer periphery of small-diameter cylindrical part 44*c* of internal gear 44 and the inner periphery of small-diameter cylindrical part 53 of the center case 5.

Such a construction allows the present invention to achieve the same advantageous effects as those achieved by the first embodiment.

Figure 5:
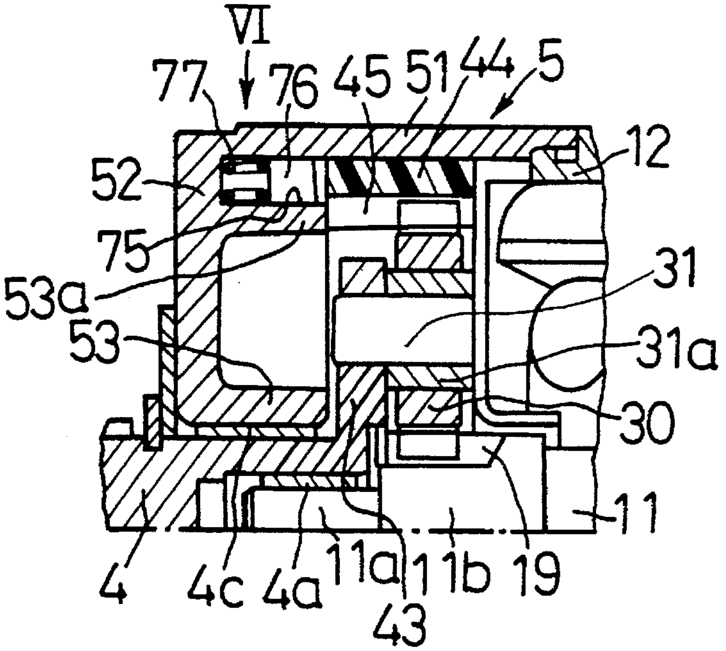
FIG. 5 is a partial cross-sectional view in the axial direction illustrating the third embodiment of the present invention.
Figure 6:
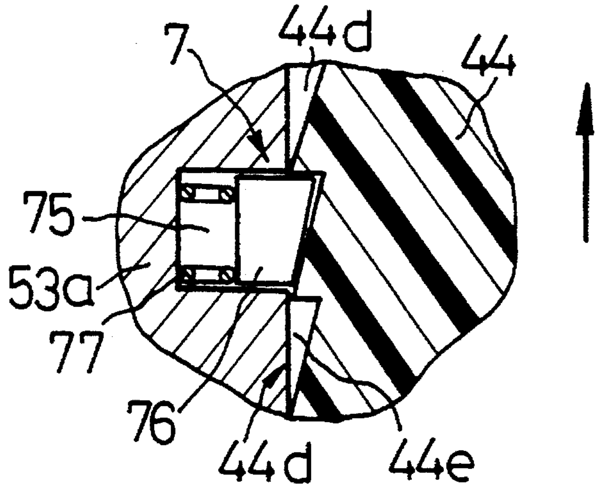
FIG. 6 is an enlarged cross-sectional view in the axial direction illustrating the main part of FIG. 5.

The third embodiment of the present invention will be described in connection with FIGS. 5 and 6. Again, like reference numerals represent like elements in the embodiments.

In this embodiment, drive shaft 4 is rotatably supported by small-diameter cylindrical part 53 of center case 5 through the bearing 4*c* as is the case with the first embodiment. However, the center case 5 is formed of die-cast aluminum or some other comparable alternative material. Large-diameter cylindrical part 51 of center case 5 is thickened radially and inwardly at the radial outside of small-diameter cylindrical part 53. A plurality of cylindrical grooves 75 are provided circumferentially at regular intervals at the left side in the axial direction from the end-wall face at the side of internal gear 44 of thick part 53*a*. Within each groove 75, pawl 76 is slidably disposed in the axial direction. Pawl 76 is pressed against the left-end face of internal gear 44 by the spring force of spring 77 housed within groove 75.

Internal gear 44 is composed only of a cylindrical part including the annulus 45. Saw-tooth-like grooves 44*e* are formed in a row on left-end face 44*d* of internal gear 44, as illustrated in FIG. 6. In addition, the tip face of pawl 76 is formed diagonally to match with saw-tooth-like grooves 44*e*. As a result, internal gear 44 can rotate upwards but downward rotation, with upward and downward being as represented by this figure.

This embodiment achieves the same effects as does the first embodiment. Furthermore, this embodiment achieves the same beneficial results as does the first embodiment.

This invention has been described in connection with what are presently considered to be the most practical and preferred embodiments of the invention. However, this invention is not meant to be limited to the disclosed embodiments, but rather is meant to cover all modifications and equivalent arrangements included within the spirit and scope of the appended claims.

What is claimed is:

1. A starter with an epicycle reduction gear comprising: a starter motor having an armature shaft with a sun gear provided on an outer periphery thereof; a drive shaft including a large-diameter part pivotally supporting planetary gears meshing with said sun gear and disposed coaxially with said armature shaft;

an internal gear including a large-diameter cylindrical part with an annular face formed on an inner periphery thereof for meshing with said planetary gears;

a casing encompassing said sun gear, said planetary gears and said internal gear;

a one-way clutch disposed between said internal gear and an inner periphery of said casing in a position proximate said internal gear and inside said casing; and a tube formed with a pinion gear thereon for engagement with an engine and rotatable with and at a same speed as said drive shaft during said engagement.

2. The starter with an epicycle reduction gear according to claim 1, wherein said internal gear comprises:

a small-diameter cylindrical part including a clutch inner member of said one-way clutch; and a large-diameter cylindrical part including said annular face and formed to be larger in diameter than said small-diameter cylindrical part; and wherein said casing encompasses an outer periphery of said small-diameter cylindrical part of said internal gear and includes a clutch outer member of said one-way clutch.

3. The starter with an epicycle reduction gear according to claim 1, wherein said one-way clutch comprises:

a ratchet-type clutch disposed between an end-wall part of said casing and an end-wall face of said internal gear facing said end-wall part of said casing.

4. The starter with an epicycle reduction gear according to claim 1, further comprising a bearing rotatably supporting a small diameter portion of said armature shaft, and wherein said one-way clutch is disposed radially outwardly from said bearing.

5. The starter with an epicycle reduction gear comprising:

a starter motor having an armature shaft with a sun gear provided on an outer periphery thereof;

a drive shaft including a large-diameter part pivotally supporting planetary gears meshing with said sun gear and disposed coaxially with said armature shaft;

an internal gear including a large-diameter cylindrical part with an annular face formed on an inner periphery thereof for meshing with said planetary gears;

a casing encompassing said sun gear, said planetary gears and said internal gear; and a one-way clutch disposed between said internal gear and an inner periphery of said casing in a position proximate said internal gear and inside said casing; and smaller in diameter than an outer periphery of said large-diameter cylindrical part of said internal gear, wherein said casing comprises:

a large-diameter cylindrical part and an end-wall part, both of which include a cylinder with a bottom encompassing said internal gear; and a small-diameter cylindrical part provided extending from a central part of said end-wall part to said internal gear and disposed coaxially with said large-diameter cylindrical part and including a clutch inner member of said one-way clutch;

wherein said internal gear comprises a small-diameter cylindrical part encompassing the outer periphery of said small-diameter cylindrical part of said casing and including a clutch outer member of said one-way clutch; and wherein said large-diameter cylindrical part includes said annular face and is formed to be larger in diameter than said small-diameter cylindrical part.

6. A starter for an internal combustion engine comprising:

a casing;

a starter motor attached to said casing;

a sun gear connected to said starter motor and disposed in said casing;

a plurality of planetary gears meshing with said sun gear and disposed in said casing;

means for supporting said planetary gears;

an internal gear having a large-diameter cylindrical part, said internal gear meshing with said planetary gears and being disposed in said casing;

a one-way clutch disposed between said internal gear and said casing proximate said internal gear, a clutch outer member being formed by a portion of said internal gear and being outside a clutch inner member formed by a portion of said casing, said one-way clutch being disposed in a position having a diameter smaller than an outer diameter of said large-diameter cylindrical part of said internal gear.

7. A starter for an internal combustion engine comprising:

a casing;

an epicycle reduction gear housed in said casing and including an internal gear; and a one-way clutch completely disposed in said casing;

wherein said epicycle reduction gear includes a plurality of planetary gears;

wherein said internal gear includes a large-diameter cylindrical part;

wherein a clutch outer member is formed by a portion of said internal gear and is outside a clutch inner member formed by a portion of said casing; and wherein said one-way clutch is formed to have a diameter smaller than an outer diameter of said large-diameter cylindrical part of said internal gear.

8. A starter as claimed in claim 7, wherein said casing comprises:

a large-diameter cylindrical part and an end-wall part, which together form a cylinder having a bottom encompassing said internal gear;

a small-diameter cylindrical part extending from a central part of said end-wall part towards said internal gear and formed coaxially with said large diameter part of said casing, said small-diameter cylindrical part including a clutch inner member.

9. A starter for an internal combustion engine comprising: a casing;

an epicycle reduction gear housed in said casing and including an internal gear; and a one-way clutch completely disposed in said casing;

wherein said epicycle reduction gear includes a plurality of planetary gears;

wherein said internal gear includes a large-diameter cylindrical part; and wherein said one-way clutch is formed to have a diameter smaller than an outer diameter of said large-diameter cylindrical part of said internal gear;

wherein said casing comprises:

a large-diameter cylindrical part and an end-wall part, which together form a cylinder having a bottom encompassing said internal gear; and a small-diameter cylindrical part extending from a central part of said end-wall part towards said internal gear and formed coaxially with said large diameter part of said casing, said small-diameter cylindrical part including a clutch inner member; and wherein said internal gear includes:

a small-diameter cylindrical part encompassing an outer periphery of said small-diameter part of said casing and forming a clutch outer member; and a large-diameter cylindrical part having interior teeth and having a diameter greater than that of said small-diameter cylindrical part.

10. A starter for an internal combustion engine, comprising:

a casing having a small-diameter part;

means for enclosing a sun gear, planetary gears, a one-way clutch and an internal gear of said starter;

wherein said one-way clutch is disposed between said internal gear and an inner periphery of said casing;

wherein said one-way clutch is disposed at a position next to said internal gear, and said clutch is smaller in diameter than an outer periphery of a large-diameter cylindrical part of said internal gear;

wherein said internal gear includes a small-diameter cylindrical part encompassing an outer periphery of said small-diameter cylindrical part of the casing and serving as a clutch outer member of said one-way clutch;

wherein a large-diameter cylindrical part of said internal gear includes interior teeth and is formed to be larger in diameter than the small-diameter cylindrical part; and wherein said casing prevents contaminants from entering thereinto.

* * * * *